(12) United States Patent
Ramalingam et al.

(10) Patent No.: US 9,088,651 B2
(45) Date of Patent: Jul. 21, 2015

(54) HANDLING INCOMING VIDEO CALLS WITH HUNT LIST

(75) Inventors: Kanagarethinam Ramalingam, Pudukkottai (IN); Bellur Srinivasa Girisha, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 385 days.

(21) Appl. No.: 13/542,848

(22) Filed: Jul. 6, 2012

(65) Prior Publication Data

US 2014/0009556 A1   Jan. 9, 2014

(51) Int. Cl.
*H04N 7/14* (2006.01)
*H04M 3/46* (2006.01)
*H04M 3/42* (2006.01)
*H04M 3/436* (2006.01)

(52) U.S. Cl.
CPC ............ *H04M 3/46* (2013.01); *H04M 3/42187* (2013.01); *H04M 3/436* (2013.01); *H04M 2201/50* (2013.01); *H04M 2203/2044* (2013.01)

(58) Field of Classification Search
USPC .................................. 348/14.08, 14.09, 14.11
See application file for complete search history.

(56) References Cited

U.S. PATENT DOCUMENTS

2008/0062253 A1   3/2008   Jaspersohn
2009/0238358 A1   9/2009   Ramanathan
2012/0092439 A1*  4/2012   Mackie et al. ............. 348/14.06

FOREIGN PATENT DOCUMENTS

GB    2 444 580 A       6/2008
GB    2444580  A    *   6/2008
WO    WO 2007/062729 A1  6/2007

OTHER PUBLICATIONS

Cisco "Installation and Troubleshooting Guide for Cisco Unified Video Advantage" version 2.1, May 10, 2010.
Cisco CallManager Adminstration Guide "Route/Hunt List Configuration" Chapter 20; 2003.
International Search Report and Written Opinion of the International Searching Authority for PCT/US13/48394 dated Sep. 4, 2013.

* cited by examiner

*Primary Examiner* — Duc Nguyen
*Assistant Examiner* — Theodore Ndje

(57) ABSTRACT

In an example embodiment, when an incoming video call associated with a hunt list is received, the call is first routed to recipients in the hunt list who are capable of receiving a video call. After the call is routed to recipients in the hunt list who are capable of receiving a video call, the call is routed to recipients in the hunt list who are incapable of receiving a video call.

20 Claims, 4 Drawing Sheets

HANDLING INCOMING VIDEO CALLS WITH HUNT LIST

TECHNICAL FIELD

The present disclosure relates generally to video telephone calls.

BACKGROUND

A route or hunt list can be employed to specify how a call should be handled. For example, a hunt list can be used by an individual user to specify a sequence of devices for routing a call. This list may be directed to certain times of day. For example, during office hours a hunt list may specify to ring a user's office phone first, then a cell phone, and finally if no connection is established, direct the call to voice mail. For a group conference call, a hunt list may contain the name of the attendees and of the conference call and how to reach the attendees.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
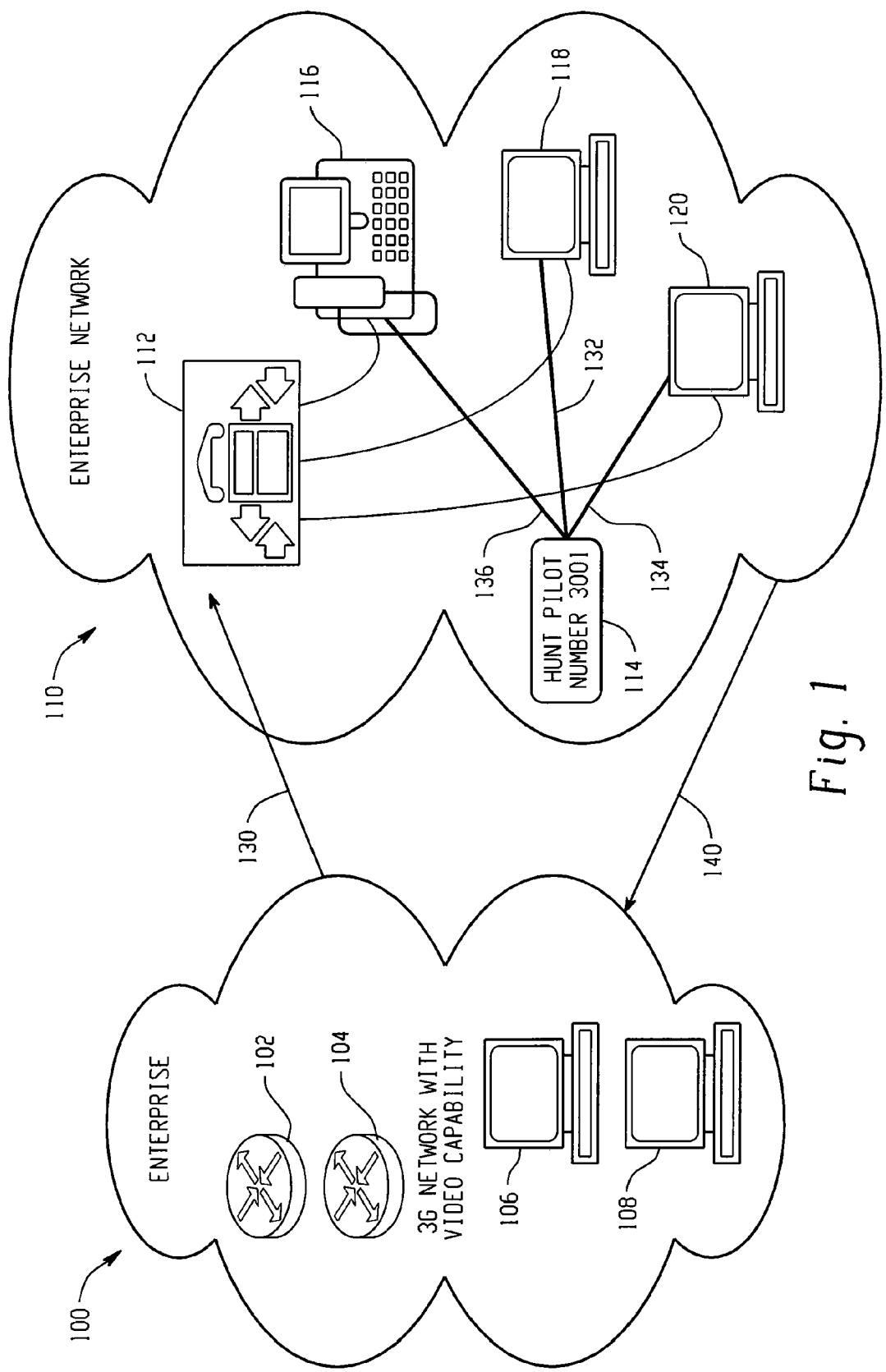
FIG. 1 is a block diagram illustrating an example of a call setup for a video call using a hunt list.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, disclosed herein is an apparatus comprising an interface, call control logic coupled with the interface, and a hunt list. The call control logic is responsive to receiving a call request for a video call for a plurality of recipients via the interface to employ the hunt list for performing call setup. The call control logic is operable to establish connections with endpoints associated with recipients selected from the plurality of endpoints that have video capabilities before establishing connections with endpoints associated with users that do not have video capabilities.

In accordance with an example embodiment, disclosed herein is a method comprising receiving an incoming call request for a plurality of recipients. A determination is made whether the call request is for a video call. A call manager attempts to establish connections with a first group of selected recipients from the plurality of recipients belonging to a hunt list prior to attempting to establish connections with a second group of recipients selected from the plurality of recipients belonging to the hunt list. The first group of recipients belonging to the hunt list are associated with devices that are capable of receiving a video call, and the second group of recipients are associated with devices that are not capable of receiving a video call.

In accordance with an example embodiment, disclosed herein is a tangible non-transitory computer readable medium for execution by a processor that when executed by a processor is operable to receive an incoming call request for a plurality of recipients associated with a hunt list. The logic is further operable to determine whether the call request is for a video call. The logic is operable to attempt to establish connections with a first group of selected recipients from the plurality of recipients belonging to the hunt list and to attempt to establish connections with a second group of recipients selected from the plurality of recipients belonging to the hunt list, wherein the first group of recipients are associated with devices that are capable of receiving a video call and the second group of recipients are associated with devices that are not capable of receiving a video call. The logic is operable to attempt to establish connections with the first group of recipients occurs before attempting to establish connections with the second group of recipients.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is a method of handling an incoming video call using a hunt list. For example, a hunt list may comprise five users, where users number one, two, and five are not capable of establishing a video call (e.g., they support an audio call), and users number three and four having video capabilities. In a top down mode, the video call would first attempt to establish a connection with user number 1 and go through the list in a sequential manner; however, in accordance with an example embodiment, the call is routed to callers having video capabilities (e.g., users number three and four in this example) before being routed to users without video capabilities (e.g., users number one, two and three in this example). In an example embodiment, a check box (for example labeled video call priority) can be employed for allowing a user to specify whether video calls should first be routed to video supported or capable devices in the hunt list.

FIG. 1 is a block diagram illustrating an example of a call setup for a video call using a hunt list. In the illustrated example, a video call is initiated from a first network 100 to an endpoint associated with a second network 110, although those skilled in the art should readily appreciate that the call could initiate from anywhere, including from within second network 110. The first network 100 may suitably comprise gateways, such as gateways 102, 104, and endpoints, such as endpoints 106, 108. In an example embodiment, the first network is a packet switched telephone network (PSTN) with video (e.g., 3G, 4G, etc.) capabilities.

The second network 110 comprises a call manager 112, such as a Cisco Unified Call Manager ("CUCM") available from Cisco Systems, Inc. 170 West Tasman Dr., San Jose, Calif. 95134. The call manager 112 creates a hunt list 114, which in the illustrated example is associated as Hunt Pilot Number 3001. While the call manager 112 associates endpoints 116, 118, 120 to the hunt list 114, the call manager will request media information for the endpoints 116, 118, 120. The endpoints 116, 118, 120 respond with media information. For example, in a Session Initiation Protocol (SIP) environment, endpoints 116, 118, 120 can respond using OPTIONS with "200 OK" with media information. This enables the call manager 112 to learn the media capabilities of endpoints 116, 118, 120 in the hunt group (list). The hunt list can be configured to employ any suitable routing protocol, such as top down (e.g., first ring endpoint 116, then endpoint 118, and then endpoint 120). In the illustrated example, endpoint 116 is capable of audio communications, but not video communications, and endpoints 118 and 120 are capable of video communications.

For example, in a top down environment, when a call is received for hunt list 114, the call would be routed first to endpoint 116, then to endpoint 118, and then to endpoint 120. However, when a video call is received (in the illustrated example from the first network 100), illustrated by 130, the call manager 112 ignores the routing protocol for the hunt list 114, and instead searches for video capable endpoints. Thus, in the illustrated example, the call manager would first try to route the call to one of endpoints 118 or 120 (endpoint 118 represented by 132 in the illustrated example), and if there is no answer, or the endpoint is busy, try to route the call to the other video capable endpoint (endpoint 120 represented by 134). If the call cannot be established with either of the video capable endpoints 118 or 120, the call manager will route the call to endpoint 116 (which is only capable of audio communications) as illustrated by 136.

In an example embodiment, where multiple hunt lists are employed, the call manager 112 will search the hunt lists for video capable endpoints first, before attempting to connect with endpoints that are not video capable. For example, if a first hunt list has three video and two audio phones, and a second hunt list has two video and three audio phones, the call manager 112 will first ring the three video phones in the first hunt list, and if the call cannot be connected to one of the three video phones in the first hunt list, the call manager 112 will then try connecting with the two video phones in the second hunt list. If the call cannot be established with the video phones in the second hunt list, then the call manager 112 will attempt to connect with the audio phones in the first hunt list, and then the audio phones in the second hunt list. Once the call is connected, a signal is sent from second network 110 to the first network 100 as illustrated by 140.

Figure 2:
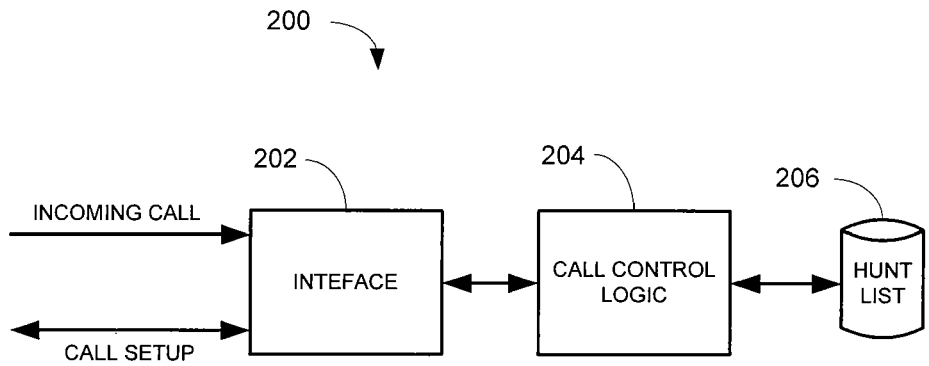
FIG. 2 is a block diagram illustrating an example of a call manager upon which an example embodiment may be implemented.

FIG. 2 is a block diagram illustrating an example of a call manager 200 upon which an example embodiment may be implemented. Call manager 200 is suitable for implementing the functionality described herein for call manager 112 in FIG. 1. The call manager 200 comprises an interface 202 for communicating with other devices via an associated network. Call control logic 204 is coupled with the interface 202 and is operable to receiving incoming call request via interface 202 and to send and receive call setup messages via interface 202. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions. A hunt list 206 may be employed by the call control logic 204 for determining how to route an incoming call request.

In an example embodiment, the call control logic 204 is responsive to receiving a call request for a video call via interface 202 for a plurality of endpoints via the interface to employ the hunt list 206 for performing call setup. The call control logic 204 is further operable to establish connections with endpoints selected from the plurality of endpoints that have video capabilities before establishing connections with endpoints selected from the plurality of endpoints that do not have video capabilities.

In an example embodiment, the call control logic 204 searches through the hunt list 206 in a top down manner. For example, the call control logic may start with the first entry in the call list and sequentially parse the call list. In particular embodiments, the call control logic 204 searches first for devices that are video capable, and performs a second loop through the hunt list 206 for devices that do not support video calls. In another example embodiment, the call control logic 204 sorts the hunt list based on video call capabilities.

In an example embodiment, the hunt list 206 comprises data representative of device type for an endpoint associated with a recipient. This can enable call control logic 204 to determine which endpoints or users support video calls.

In an example embodiment, the hunt list 206 comprises data representative of bandwidth for an endpoint associated with a recipient. This can enable call control logic 204 to determine whether an endpoint can support a video call. For example, the call control logic 204 can determine whether the bandwidth for an endpoint is sufficient to support a video call. Moreover, the call control logic 204 can determine that an endpoint is not a video capable endpoint responsive to determining that the bandwidth available for a connection to the endpoint is insufficient for video conferencing.

In an example embodiment, the hunt list 206 may further comprise a user hunt list associated with a recipient of the video call. For example, a user may specify during office hours a desired sequence of devices for establishing a call. However, the call control logic 204 will attempt to establish a connection with video capable devices listed in the user hunt list for the recipient prior to attempting to connect with devices that are not video capable. The call control logic 204 determines an endpoint is not video capable in response to being unable to establish a connection with a video capable device associated with the recipient.

Figure 3:
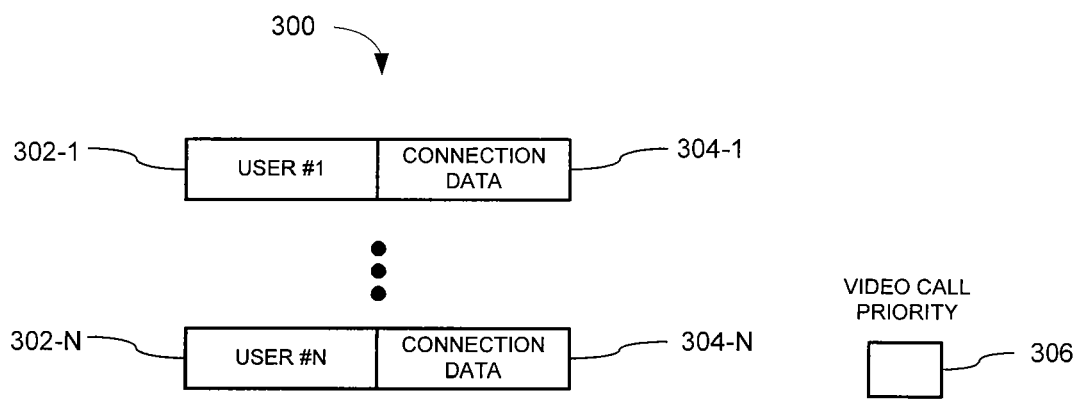
FIG. 3 illustrates an example of a hunt list.

FIG. 3 illustrates an example of a hunt list 300. The hunt list 300 lists N users, where N is an integer greater than one. N may be any physically realizable number. For a recipient (user), the list comprises a user field (e.g., user #1, 302-1 through user #N, 302-N) with data representative of the recipient, and connection data is associated with the user entry (e.g., for user #1 the connection data is stored in connection data field 304-1 and for user #N the connection data is stored in field 304-N).

In particular embodiments, the hunt list 300 comprises a video call priority field 306, such as a check box, for specifying whether a video call should first be routed to video capable devices in the hunt list. In other embodiments, the default behavior is to route video calls first to video capable devices before routing to devices that are incapable of supporting video devices.

Figure 4:
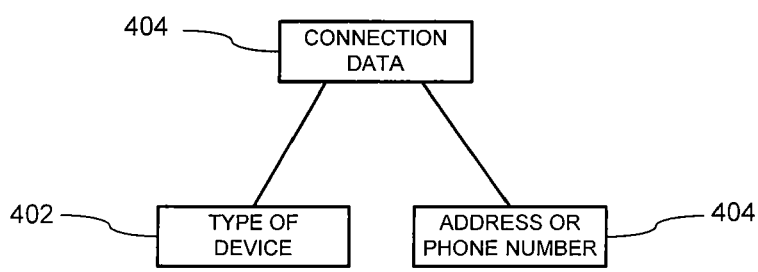
FIG. 4 illustrates an example of connection data stored in a hunt list for a user.

FIG. 4 illustrates an example of connection data 404 stored in a hunt list for a user. The connection data 404 may suitably comprise data representative of a type of device 402 and/or data representative of an address or phone number 404. The data representative of a type of device 402 may suitably comprise data that describes the device and/or characteristics of the device such as whether the device can handle a video call. The data representative of an address or phone number 404 may suitably comprise an address for a computing device, such as a Media Access Control (MAC) address or an Internet Protocol (IP) address, or a telephone number associated with the device.

Figure 5:
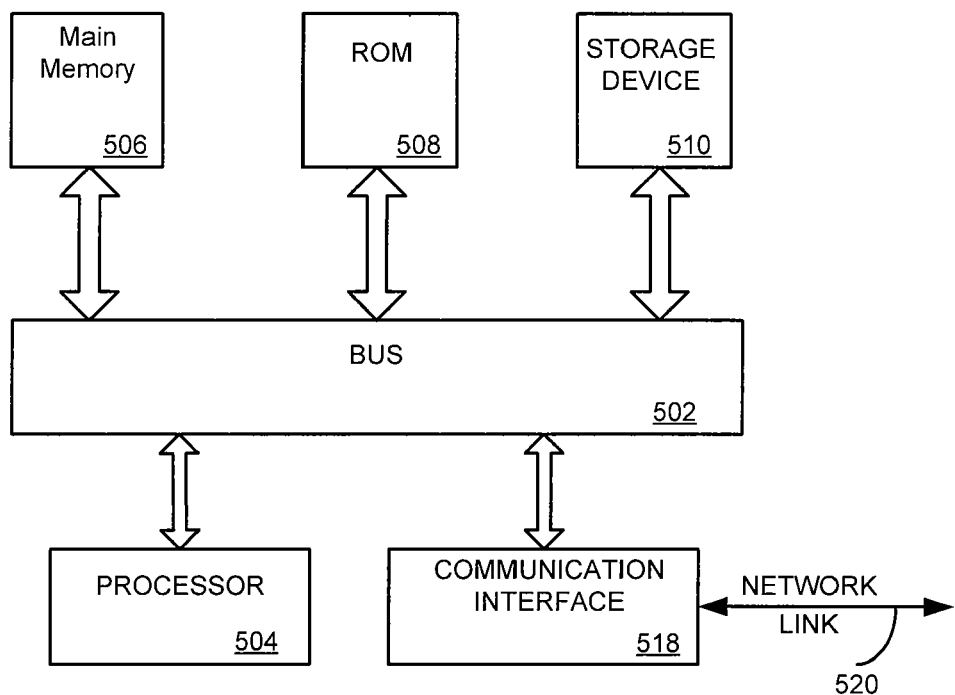
FIG. 5 is a block diagram that illustrates a computer system upon which an example embodiment may be implemented.

FIG. 5 is a block diagram that illustrates a computer system 500 upon which an example embodiment may be implemented. For example, computer system 500 may be employed to implement call manager 112 in FIG. 1 and/or call control logic 204 in FIG. 2.

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, optical disk, and/or flash storage, is provided and coupled to bus 502 for storing information and instructions.

An aspect of the example embodiment is related to the use of computer system 500 for handling incoming video calls with a hunt list. According to an example embodiment, handling incoming video calls with a hunt list is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media. Non-volatile media include, for example, optical or magnetic disks, such as storage device 510. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 500 also includes a communication interface 518 coupled to bus 502. Communication interface 518 provides a two-way data communication coupling computer system 500 to a network link 520 that enables computer system to communicate with external devices (not shown) in order to establish a video call. Although the example illustrated in FIG. 5 has only one communication interface 518, those skilled in the art can readily appreciate this example was selected merely for ease of illustration and that in accordance with an example embodiment multiple communication interfaces 518 may be employed. For example, one communication interface 518 may be employed to communicate with a plain old telephone system (POTS) network, another communication interface 518 may be employed to communicate with a cellular network, and yet another communication interface 518 may be employed to communicate over an Internet Protocol (IP) network to facilitate establishing a Voice over IP (VoIP) session.

Figure 6:
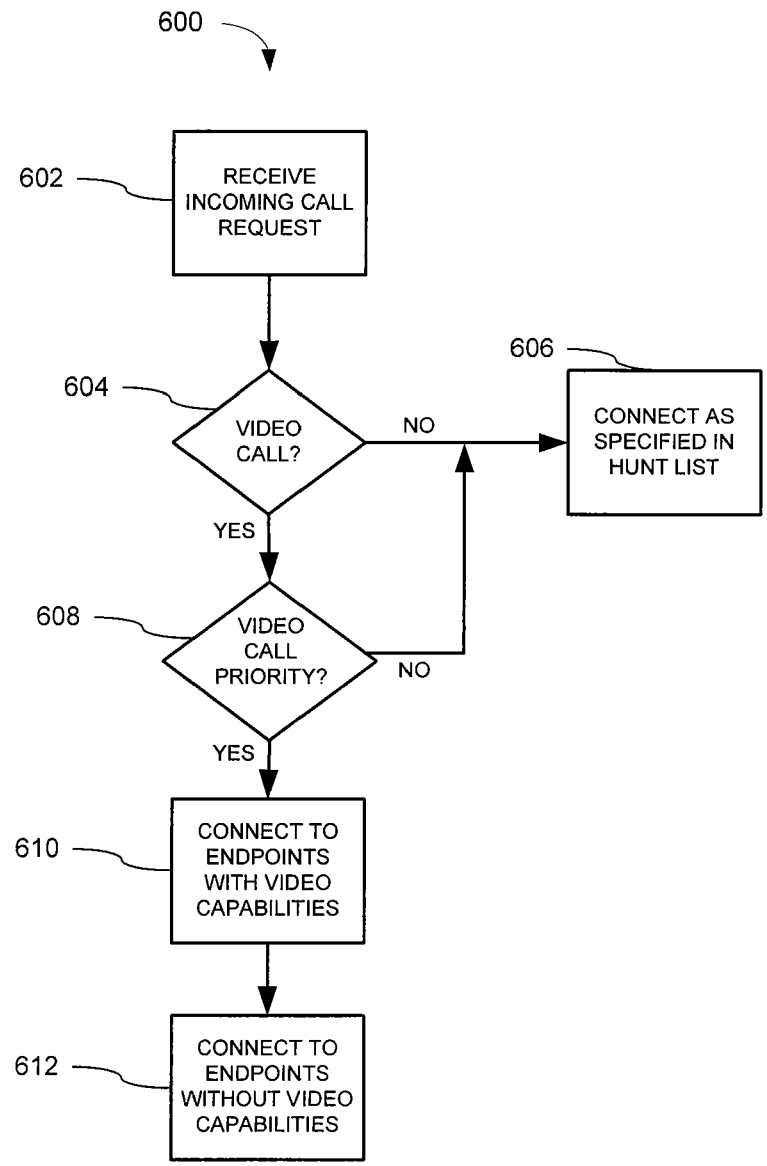
FIG. 6 is a block diagram that illustrates a methodology for handling a video call employing hunt list.

In view of the foregoing structural and functional features described above, a methodology 600 in accordance with an example embodiment will be better appreciated with reference to FIG. 6. While, for purposes of simplicity of explanation, the methodology 600 of FIG. 6 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement an example embodiment. The methodology 600 described herein is suitably adapted to be implemented in hardware, software, or a combination thereof. For example, methodology 600 may be implemented by call manager 112 (FIG. 1), call control logic 204 (FIG. 2) and/or processor 504 (FIG. 5).

At 602, an incoming call request is received. The incoming call is associated with a hunt list that is to be processed in a top down manner.

At 604, a determination is made whether the incoming call is a video call. If the call is not a video call (NO), the call is established in the order listed in the hunt list as illustrated at 606.

If, at 604, a determination is made that the call is a video call (YES), at 608, a determination is made whether call should be connected using video call priority. In some embodiments, the default behavior is to employ video call priority in which case the methodology would skip from 604 to 610.

If, at 608, the determination is made that the video call priority is not enabled for the hunt list (NO), the call is established in the order listed in the hunt list as illustrated at 606.

However, if, at 608, the determination is made that video call priority is established (YES), at 610, connections are made to endpoints (recipients) in the hunt list that have video capabilities. In an example embodiment, the hunt list is searched in a top down manner for endpoints with video capabilities. In another example embodiment, the hunt list is sorted so that endpoints with video capabilities are at the top of the list. In an example embodiment, a call manager can determine whether an endpoint is capable of supporting a video call based on the bandwidth for the endpoint. If the endpoint is using insufficient bandwidth for a video call, the endpoint is marked as incapable of handling a video call.

In an example embodiment, one of the recipients of the call may employ a hunt list where some devices on the hunt list are video capable and some devices are not video capable. For example, a recipient may have a hunt list configured for use during office hours to connect to a desk phone with video capabilities first, if the first connection is unavailable (e.g., either busy and/or no answer), to a second phone associated with the user that does not have video capabilities. If the user does not answer the desk phone with video capabilities, the recipient is determined to be unable to support video calls and skipped over until endpoints supporting video calls are connected. Once the endpoints supporting video calls are connected, the call is routed to the second phone associated with the user.

After the connections have been made with endpoints having video capabilities, at 612 the video call is established with devices without video capabilities. For example, devices without video capabilities may include phones with only audio capabilities.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an interface;
call control logic coupled with the interface;
a first hunt list; and
a second hunt list;
wherein the call control logic is responsive to receiving a call request for a video call for a plurality of recipients via the interface to employ the first and second hunt lists for performing call setup;
wherein the call control logic is operable to selectively establish connections with endpoints associated with a first plurality of recipients selected from the plurality of recipients belonging to the first hunt list that have video capabilities before establishing connections with endpoints associated with recipients belonging to: i) the first or second hunt lists that do not have the video capabilities or ii) the second hunt list that have the video capabilities; and
wherein the call control logic is operable to selectively establish connections with endpoints associated with a second plurality of recipients selected from the plurality of recipients belonging to the second hunt list that have the video capabilities before establishing connections with endpoints associated with recipients belonging to the first or second hunt lists that do not have video capabilities.

2. The apparatus set forth in claim 1, wherein the call control logic operable to selectively searches through the first hunt list in a top down manner.

3. The apparatus set forth in claim 2, wherein the call control logic operable to selectively sorts the hunt list based on video call capabilities.

4. The apparatus set forth in claim 1, wherein the first hunt list comprises data representative of device type for an endpoint selected from the plurality of endpoints.

5. The apparatus set forth in claim 1, wherein the first hunt list comprises data representative of bandwidth for an endpoint selected from the plurality of endpoints.

6. The apparatus set forth in claim 1, wherein the call control logic determines that an endpoint is not a video capable endpoint responsive to determining a bandwidth available for a connection to the endpoint is insufficient for video conferencing.

7. The apparatus set forth in claim 1, wherein the first hunt list comprises a user hunt list associated with a recipient selected from the plurality of recipients.

8. The apparatus set forth in claim 7, wherein the call control logic attempts to establish a connection with video capable devices listed in the user hunt list for the recipient prior to attempting to connect with devices that are not video capable.

9. The apparatus set forth in claim 8, wherein the call control logic determines an endpoint is not video capable responsive to being unable to establish a connection with a video capable device associated with the user.

10. A method, comprising:
receiving an incoming call request for a plurality of recipients;
determining whether the call request is for a video call;
attempting, by a call manager, to establish one or more connections with a first group of recipients selected from the plurality of recipients belonging to a first hunt list prior to attempting to establish connections with a second group of recipients selected from the plurality of recipients belonging to the first hunt list, and prior to attempting to establish connections with third and fourth groups of recipients selected from the plurality of recipients belonging to a second hunt list; and
attempting, by a call manager, to establish one or more connections with the third group of recipients selected from the plurality of recipients belonging to the second hunt list prior to attempting to establish connections with the second group of recipients selected from the plurality of recipients belonging to the first hunt list, and prior to attempting to establish connections with the fourth group of recipients selected from the plurality of recipients belonging to a second hunt list;
wherein the first and third groups of recipients are associated with devices that are capable of receiving a video call;
wherein the second and fourth groups of recipients are associated with devices that are not capable of receiving a video call.

11. The method of claim 10, further comprising searching the first hunt list in a top down manner.

12. The method of claim 10, further comprising sorting the first hunt list so that the first group of recipients are at the top of the first hunt list.

13. The method of claim 10, wherein:
the first hunt list comprises data representative of bandwidth; and
the first group of recipients comprises recipients with sufficient bandwidth for the video call.

14. The method of claim 10, wherein:
the first hunt list comprises data representative of bandwidth; and
the second group of recipients comprises recipients with insufficient bandwidth for a video call.

15. The method of claim 10, wherein the first hunt list further comprises a user hunt list specifying a sequence of associated devices of a user for routing the one or more connections to the associated user.

16. Logic encoded in a non-transitory computer readable medium for execution by a processor, and when executed operable to:
receive an incoming call request for a plurality of recipients associated with one or more of a first or second hunt list;

determine whether the call request is for a video call;

attempt to establish one or more connections with a first group of recipients selected from the plurality of recipients belonging to the first hunt list;

attempt to establish one or more connections with a second group of recipients selected from the plurality of recipients belonging to the first hunt list;

attempt to establish one or more connections with a third group of recipients selected from the plurality of recipients belonging to the second hunt list;

wherein the first group of recipients are associated with devices that are capable of receiving a video call;

wherein the second group of recipients are associated with devices that are not capable of receiving a video call;

wherein the third group of recipients are associated with devices that are capable of receiving a video call;

wherein the logic is further operable to attempt to establish connections with the first group of recipients before attempting to establish connections with the second or third groups of recipients; and wherein the logic is further operable to attempt to establish connections with the third group of recipients before attempting to establish connections with the second group of recipients.

17. The logic set forth in claim 16, further operable to search the first hunt list in a top down manner.

18. The logic set forth in claim 17, further operable to sort the hunt list so that the first group of recipients are at the top of the first hunt list.

19. The logic set forth in claim 16, further operable to determine whether a recipient belongs to the first group of recipients or the second group of recipients based on a device type stored in the first hunt list.

20. The logic set forth in claim 16, further operable to determine whether a recipient belongs to the first group of recipients or the second group of recipients based on bandwidth.

* * * * *